April 21, 1959 G. C. SZIKLAI ET AL 2,883,454

SIGNALLING SYSTEMS

Filed Nov. 8, 1952

INVENTOR.
ROBERT D. LOHMAN
& GEORGE C. SZIKLAI

BY [signature]

ATTORNEY 2,883,454

SIGNALLING SYSTEMS

George C. Sziklai, Princeton, and Robert D. Lohman, Princeton Junction, N.J., assignors to Radio Corporation of America, a corporation of Delaware Application November 8, 1952, Serial No. 319,492

6 Claims. (Cl. 178—7.5)

This invention relates to electrical signalling systems and particularly to signal correction, signal separation, and amplifying operations in such systems.

In systems for the transmission of electrical signals, such as television or facsimile systems, it is often necessary to correct for variations in the effective amplitude of signals representative of intelligence, such as may arise in the transmission of said signals as the result of the complete or partial loss of the D.C. and/or low frequency components of said signals or the incorrect representations of those components. Various signal correction circuits have been proposed for the reinsertion of the above-mentioned components where the components have been suppressed during transmission, as, for example, where they are suppressed by transformers or by alternating current amplifiers. These circuits depend for their operation upon the transmission of periodically recurring control pulses which are caused to go to a fixed voltage level, such as "black," in a picture, or a few volts beyond "black" before the said components have been suppressed. In television systems, the recurring pulses of the latter type usually are the synchronizing pulses. An excellent discussion of the problem of D.C. reinsertion with analysis of various suggested forms of reinserting circuits is contained in an article entitled "Television D.C. Component" by Karl R. Wendt, commencing on page 85 of the march 1948 issue of the RCA Review.

It is also desirable in electrical signalling systems, such as television or facsimile systems, wherein periodically recurring control pulses of previously mentioned character are utilized in the synchronization of scanning operations, to separate such control pulses from the accompanying picture signals. It is also generally requisite that the separated control pulses be amplified before their utilization.

The present invention proposes a simple circuit employing a single transistor which may serve simultaneously to correct a composite electrical signal to achieve the proper reinsertion of D.C. and/or low frequency components of such a signal, to also separate periodically recurring control pulses, such as synchronizing pulses, from the remainder of the signal, and to also amplify these separated control pulses.

In an embodiment of the present invention, the base-emitter path of a junction transistor is connected between a point of reference potential and the input terminal or electrode of a element, tube, or device which is to have the reinserted D.C. component in its output. In operation, the capacitor, which couples said input terminal to the output circuit of the previous signalling stage or composite signal source, charges and discharges through this path, which path presents a low impedance to charging current flowing therethrough when the control pulse peaks occur and which presents a relatively high impedance to discharging current flowing in the opposite direction therethrough during the remaining portions of the signal. The action is similar to that of the basic diode and grid-rectification types of D.C. restorers in that a bias is developed in the input circuit of the signal-recipient tube or device through the cumulative effects of the incremental charges and partial discharges of the coupling capacitor, which bias is effectively added to the incoming composite signal to set the control pulse peaks at a predetermined voltage level. As variations in picture content cause control pulse peaks to depart from this level, the resultant variations in charging current flow readjust the value of bias developed to the correct amount necessary to bring subsequent control pulse peaks of signals of like picture content to the predetermined voltage level. It is to be noted, however, that whereas the above-mentioned diode and grid-rectification types of D.C. restorers required a separate grid-leak resistor in the input circuit of the signal-recipient tube or device as a discharge path for the coupling capacitor, the present invention requires no separate discharge path, the back impedance of the base-emitter path serving in place of a grid leak resistor.

Emitter-collector current flows in a load circuit for the transistor only when the current flow in the base-emitter path is in the "easy," or low impedance, direction. Thus, current flows in the load circuit only during the appearances of the recurring control pulse portions of the signal, and an output signal appearing across an impedance in this load circuit consists of a series of pulses, synchronous with the control pulses of the composite signal and of increased amplitude due to the amplifying action of the transistor.

It is an object of the present invention to provide an improved and simplified signal correction circuit for reinserting direct current and/or low frequency components in a signal which has suffered the loss or incorrect representation of such components.

A further object of the present invention is to provide, in a system for transmission of signals which include periodically recurring control pulses, improved apparatus for separating the control pulses from the remaining portions of the signals.

An additional object of the present invention is to provide simplified apparatus for simultaneously achieving both of the aforementioned objects.

Another object of the present invention is to provide a television system with an improved and simplified D.C. reinsertion circuit.

A further object of the present invention is to provide a television system with an improved and simplified sync separator.

An additional object of the present invention is to provide an improved television receiver wherein the functions of D.C. reinsertion, sync separation and sync amplification are all performed by a simple circuit employing a single transistor.

Other and incidental objects and advantages of the present invention will be apparent to those skilled in the art from a reading of the following specification and an inspection of the accompanying drawings in which.

Figures 1, 1A, 2:
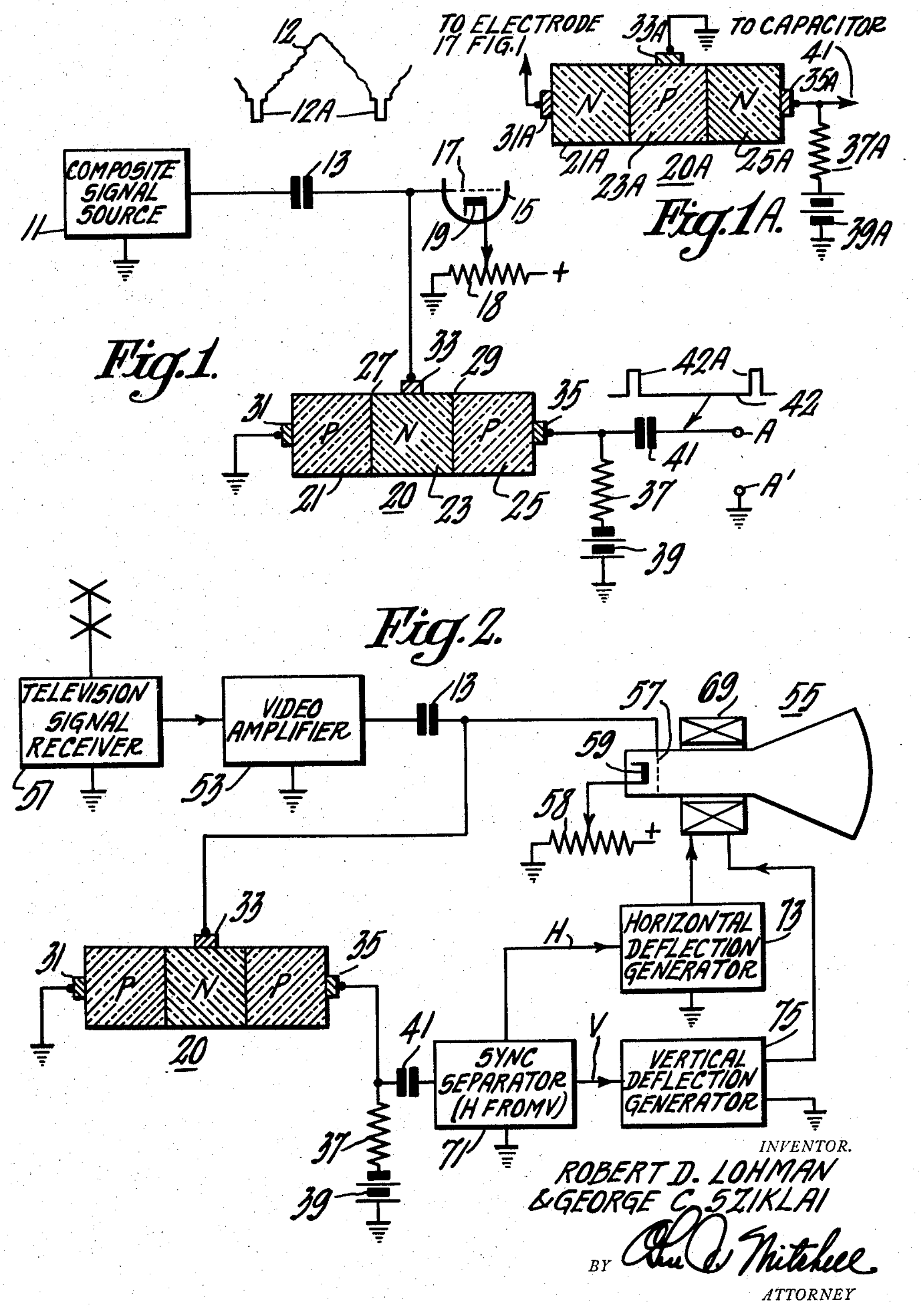
Fig. 1 is a schematic circuit diagram of a combined signal correction-signal separation circuit, illustrative of an embodiment of the present invention.
Fig. 1A is a schematic circuit diagram of another embodiment of the present invention, a modification of the combined signal correction-signal separation circuit shown in Fig. 1.
Fig. 2 is a schematic circuit diagram showing the embodiment illustrated in Fig. 1 as applied to use in a television receiver.

In Fig. 1 a source 11 of composite signals is coupled by a capacitor 13 to an input terminal (electrode 17) of a subsequent stage, element or device in a signalling system. The source 11 may, for example, be some stage of a television transmitter or receiver, such as a video amplifier, the video signal output of which has lost or erroneously represents its D.C. and/or low frequency components. The stage incorporating input electrode 17 may then be some subsequent operator upon the video signal or vedio signal utilization device, such as the modulating amplifier in a transmitter or the image reproducing device in a receiver, for which it is desirable or requisite that the video signal input thereto contain the proper D.C. and low frequency components. The input electrode 17 may be the control grid of an electron tube 15, as shown, or may, for example, be the cathode of an electron tube or an input electrode of a transistor.

The composite signal wave 12 appearing as the output of source 11 has periodically recurring control pulses 12A, such as the synchronizing pulses in a television signal. Were it not for the complete or partial loss of the D.C. and/or low frequency components in stage 11 and in the capacitive inter-stage coupling, the signal level at input electrode 17 would be the same at each occurrence of a control pulse peak. But with the loss of the D.C. component, the signal level at electrode 17 for control pulse peaks changes with variations in intelligence content of the signal portions intervening the control pulses, if correction is not provided. The present invention provides a signal correction circuit in which a signal-developed bias is, in effect, added to the composite signal on electrode 17, the bias development responding to the effect of variations in intelligence content of the signal portions intervening the control pulses so as to continually adjust the bias in the proper direction to bring each control pulse peak to the same predetermined voltage level.

The signal correction circuit employs a current path in a junction transistor. The illustrated junction transistor 20 is of the p-n-p type, comprising a body of semiconductive material, such as germanium or silicon, having two p-type regions 21 and 25, separated by and contiguous with opposite surfaces of an n-type region 23. Electrical "barriers," as discussed in U.S. Patent No. 2,569,347 to William Shockley, issued on September 25, 1951, occur at the interfacial junctions 27, 29. The electrodes 31, 33, and 35, by which external circuit connections are made to the respective regions 21, 23, and 25, make essentially ohmic (non-rectifying) contacts with their respective regions. In accordance with conventional nomenclature in the transistor field, the electrodes 31, 33, and 35 will be referred to as emitter, base, and collector, respectively.

The practitioner of the present invention who should desire a theoretical background on junction transistors in general may refer to the aforesaid Shockley patent and to the following publications for a preliminary knowledge of the nature of the junction transistor, some of its better known characteristics, and projected theories of its operation: "The Theory of p-n Junctions in Semiconductors and p-n Junction Transistors" by W. Shockley, appearing in volume 28 (1949) of the Bell System Technical Journal, starting at page 435; "Electrons and Holes in Semiconductors" by W. Shockley, published by D. Van Nostrand Co. in 1950; "p-n Junction Transistors" by W. Shockley, M. Sparks, and G. K. Teal, appearing in volume 83 of the Physical Review, starting at page 151 in the July 1, 1951 issue; "Some Circuit Properties and Applications of n-p-n Transistors" by R. L. Wallace, Jr. and W. J. Pietenpol, appearing in volume 39 of the Proceedings of the I.R.E., starting at page 753 in the July 1951 issue.

In the circuit shown in Fig. 1, the base electrode 33 of the transistor 20 is connected to the input electrode 17, the control grid of tube 15. The emitter electrode 31 of the transistor 20 is connected to a point of reference potential, which is ground in the illustrated embodiment. Whenever the potential of base 33 is more negative than the potential of emitter 31, the base-emitter path of the transistor 20 presents a relatively low impedance to conventional current flow in the emitter-to-base direction. Whenever the potential of base 33 is more positive than the potential of emitter 31, the base-emitter path of the transistor 20 presents a relatively high impedance to conventional current flow in the base-to-emitter direction. The base-emitter circuit of transistor 20 thus provides a low impedance charging path and a relatively high impedance discharging path for the coupling capacitor 13.

Thus, when the applied composite signal first drives the electrode 17 more negative than the reference potential to which emitter 31 is connected, current flows in the "easy," low impedance direction through the base-emitter path of transistor 20 and a charge is accumulated on capacitor 13. During the following portion of the signal when the electrode 17 is driven more positive than the reference potential, the capacitor 13 partially discharges through the then high impedance base-emitter path of the transistor 20. After a period of these incremental charges and partial discharges, a charge has been built up on capacitor 13 which is much larger than the incremental charges and discharges of capacitor 13. There is thus, in effect, added to the composite signal appearing at electrode 17 a D.C. component voltage or bias which elevates the signal levels at electrode 17 such that the peaks of control pulses 12A occur at levels only slightly more negative than the reference potential.

Charging current then flows in the "easy" direction through the base-emitter path only during the most negative portions of the composite signal 12, i.e. only as the control pulses 12A approach their peak value. During periods of little change in intelligence content of the signal portions intervening the control pulses 12A, an equilibrium bias is approached whereby each incremental charge of capacitor 13 is substantially equal to the subsequent incremental discharge. Each control pulse peak appears at electrode 17 at substantially the same level, slightly more negative than the reference potential.

If the control pulse peaks commence to appear below this level due to change in signal content (e.g. in a television system, due to a change from a dark picture to a brighter picture), an increase in charging current results. The incremental charges again exceed the incremental discharges, and the D.C. component voltage or bias developed across the capacitor 13 is built up to a larger value sufficient to bring control pulse peaks under the new signal conditions to the desired level.

If on the other hand the change in signal content is in the other direction (e.g. in television systems, a change toward a darker picture), resulting in control pulse peaks appearing above the desired level, there is less flow of charging current and the D.C. component voltage or bias developed across the capacitor 13 diminishes to a smaller value, proper under those signal conditions to bring control pulse peaks to the desired level. It is thus seen that there is provided a simple D.C. reinsertion circuit which is continually capable of readjusting a signal-developed bias in the proper direction to set control pulse peaks at a desired level.

It is to be noted that in the arrangement illustrated in Fig. 1, the cathode 19 of tube 15 is adjustably connected to a point of positive potential via tap connection to potentiometer 18. Thus, while the level of signal potential set at grid 17 of tube 15 for control pulse peaks is determined by the reference potential to which emitter 31 is connected, the actual grid-to-cathode potential existing in tube 15 when control pulse peaks sit at this level may be adjusted by varying the potential of cathode 19. It will be appreciated that, though not shown in Fig. 1, similar means may be provided for varying the potential of emitter 31 to adjust the signal level on grid 17 at which control pulse peaks are set.

While the transistor circuit arrangement of Fig. 1 has been shown to function satisfactorily as an improved D.C. reinsertion circuit, it will now be seen that it functions not only as a signal correction circuit but also as a signal separation circuit. The characteristics of a junction transistor are such that when conventional current flow through the base-emitter path of a p-n-p junction transistor is in the base-to-emitter direction (i. e. when there is "reverse bias" between base and emitter), there will be substantially no current flow in a load circuit connected between the emitter and collector of the junction transistor. However, when conventional current flow through the base-emitter path is in the emitter-to-base direction (i.e. when there is "forward bias" between base and emitter), there will be a current flow in a load circuit connected between emitter and collector, provided a potential difference exists between emitter and collector. These characteristics of a junction transistor are discussed in greater detail in the copending application of George C. Sziklai, Serial No. 308,618, filed on September 9, 1952, and entitled "Electronic Switching," now U.S. Patent No. 2,728,857, issued are December 27, 1955. The present invention utilizes these characteristics of a junction transistor to achieve separation of recurring signal portions, such as control pulses 12A, from a composite signal, such as signal 12.

In Fig. 1, the emitter-collector load circuit consists of a load impedance, symbolically indicated by resistor 37, and a source of potential, such as battery 39, connected in series between the emitter 31 and the collector 35. A pair of output terminals A, A′ are provided, the terminal A being coupled via capacitor 41 to the collector 35, and terminal A′ being grounded. As we have seen before in our discussion of the signal correction aspects of the present invention, after a brief initial build-up of the D.C. component voltage or bias across capacitor 13, current flows through the base-emitter path of the junction transistor 20 in the "easy," emitter-to-base direction only during the occurrence of the control pulses 12A and current flows in the opposite direction through the base-emitter path during the remaining portions of signal 12. Thus, in view of the previously discussed characteristics of a junction transistor, current flows in the load circuit connected between emitter 31 and collector 35 only during the occurrence of the control pulses 12A. Hence, a voltage pulse is generated across the load impedance 37 each time that a control pulse 12A appears at the grid 17, and the generated pulses exceed in amplitude the corresponding control pulses 12A by a predetermined ratio due to the amplifying action of a junction transistor in a base input arrangement. There is thus available at output terminals A, A′, for suitable utilization in the signalling system, an output voltage wave 42 which consists of a series of separated and amplified control pulses 42A.

Fig. 1A illustrates another embodiment of the present invention in which the base-emitter path of a junction transistor is again utilized as a charging and discharging path for the interstage coupling capacitor 13 to effect restoration of the D.C. and low frequency components of a composite signal 12. It is to be noted, however, that this embodiment differs from that shown in Fig. 1 in that an n-p-n junction transistor is employed in an emitter input arrangement.

The n-p-n junction transistor 20A, illustrated in Fig. 1A, comprises a body of semiconductive material, such as germanium or silicon, having two n-type regions 21A and 25A, separated by and contiguous with opposite surfaces of a p-type region 23A. External circuit connections are made to the respective regions 21A, 23A, and 25A by means of an emitter electrode 31A, base electrode 33A, and collector electrode 35A, which make essentially ohmic (non-rectifying) contacts with their respective regions.

The emitter electrode 31A of the transistor 20A is connected to input electrode 17, the control grid of tube 15. The base electrode 33A of the transistor 20A is connected to a point of reference potential, which is ground in the illustrated embodiment. Whenever the potential of emitter 31A is more negative than the potential of base 33A, the base-emitter path of the transistor 20A presents a relatively low impedance to conventional current flow in the base-to-emitter direction. Whenever the potential of emitter 31A is more positive than the potential of the base 33A, the base-emitter path of the transistor 20A presents a relatively high impedance to conventional current flow in the emitter-to-base direction.

It is thus to be noted that the "easy," low impedance direction of current flow in the base-emitter path of an n-p-n junction transistor is the base-to-emitter direction, whereas the "easy," low impedance direction of current flow in the base-emitter path of a p-n-p junction transistor was noted to be the emitter-to-base direction. However, since the roles of the base and emitter electrodes in the arrangement of Fig. 1A are the reverse of those in the arrangement of Fig. 1 (i.e. the base 33A being the electrode connected to the point of reference potential, and emitter 31A being the electrode connected to the signal electrode 17), it will be appreciated that the base-emitter circuit of the transistor 20A functions in a manner similar to that previously described for the base-emitter circuit of the transistor 20 in Fig. 1 toward effecting the desired D.C. reinsertion for the composite signal 12.

However, in contrast with the base input arrangement of Fig. 1, there is a second charging current path in the arrangement of Fig. 1A which aids in the level setting action. As has been noted before, current flows between the emitter and collector of a junction transistor only when the current flow between the base and emitter is in the "easy," low impedance direction. Thus, whenever the electrode 17 is driven more negative than the reference potential to which base 33A is connected (i.e. during the occurrence of a control pulse peak), there is an additional charging current flow between collector 35A and emitter 31A which adds to the effect of the base-emitter current flow in setting control pulse peaks at a level slightly below the reference potential.

The collector-emitter charging current path includes a load or pulse output circuit comprising, in series, a load impedance, symbolically indicated by resistor 37A, and a potential source, such as battery 39A, which is connected between the collector 35A and ground. Since current flows through the impedance 37A only during the periods of appearance at electrode 17 of control pulses, an output waveform generated across impedance 37A is in the form of a series of recurring separated control pulses, available for appropriate utilization in other stages of the signalling system. It will be appreciated that these output pulses will be opposite in polarity to the output pulses 42A shown in Fig. 1, since the polarity of the collector potential supply 39A employed for the n-p-n junction transistor 20A is opposite to the polarity of the collector potential supply 39 employed for the p-n-p junction transistor 20.

The two embodiments which have been heretofore discussed, namely, that of Fig. 1 employing a p-n-p type transistor in a base input arrangement, and that of Fig. 1A employing an n-p-n type transistor in an emitter input arrangement, are particularly appropriate for operation on a composite signal, such as signal 12, at a stage wherein the recurring control pulses extend in a negative direction. In a stage wherein the recurring control pulses of the composite signal extend in a positive direction, modifications of these embodiments would be in order (i.e. substituting an n-p-n type transistor in a base input arrangement of the type shown in Fig. 1, or substituting a p-n-p type transistor in an emitter input arrangement of the type shown in Fig. 1A).

In any given stage, the choice between a base input arrangement as exemplified in Fig. 1 or an emitter input arrangement as exemplified in Fig. 1A will largely depend upon the characteristics of the particular transistor units available for utilization. If the problem of "leakage" current between base and collector electrodes (i.e. that constant component of collector current usually referred to as $I_{co}$ in the literature) exists to a significant degree in the transistor units available, the emitter input type arrangement is preferable to insure accurate level setting though current gain in the control pulse separation operation will necessarily be less than unity. On the other hand, if in the available transistor units the extent of "leakage" current flow between base and collector is insignificant, the base input type arrangement will generally be preferable due to the substantial current gain obtainable in the emitter-collector output circuit.

Fig. 2 shows a particular application of the base input type arrangement, as exemplified in Fig. 1, to use in a television receiving system. A conventional television signal receiver 51 is provided for receiving and demodulating a transmitted television carrier wave. Briefly it may comprise carrier wave amplifying apparatus, a frequency converter, and a signal detector by means of which composite television signals, including video and control signals, such as synchronizing pulses, are recovered from the carrier wave. A conventional video amplifier 53, coupled in the usual manner to signal receiver 51, amplifies the composite signal output thereof.

The video amplifier 53 is capacitively coupled by the capacitor 13 to the input electrode 57 of an image reproducing device 55, which may be a kinescope of conventional type, having the customary components such as a deflection yoke 69 and an electron gun including a cathode 59 and control grid 57. The electron beam deflection in the image reproducing device 55 is controlled, via deflection yoke 69, by scanning waves supplied by the horizontal deflection generator 63 and the vertical deflection generator 65, which function in the usual manner to produce respectively sawtooth wave energy at horizontal and vertical deflection frequencies.

As in Fig. 1, a p-n-p type junction transistor 20 is provided, having emitter, base and collector electrodes, 31, 33, and 35, respectively. The base electrode 33 of the transistor 20 is connected to the input electrode 57, the beam intensity control grid of the image reproducing device 55. The emitter electrode 31 of the transistor 20 is connected to a point of reference potential, which is ground in the illustrated embodiment. With the base-emitter path of the transistor 20 thus providing a low impedance charging path and a high impedance discharging path for the capacitor 13 as previously explained, a D.C. component voltage or bias is built up across the capacitor 13, which is effectively added to the composite signal output of the video amplifier 53 to set the signal level at grid 57 for sync pulse peaks at a potential slightly below the reference potential to which emitter 31 is connected. As variations in the average brightness of the picture content in the video signal portions of the applied composite signal tend to cause the sync pulse peaks to depart from this level, the D.C. component voltage or bias builds up or diminishes, in the manner previously described, to the new value necessary to return the sync pulse peaks to this level.

The cathode 59 of the image reproducing device 55 is adjustably connected to a point of positive potential via tap connection to potentiometer 58. The adjustable cathode bias permits control of the brightness of the image reproduction developed by the device 55. Thus while the level of signal potential set at grid 57 for sync pulse peaks is determined by the reference potential to which emitter 31 is connected, the actual grid-to-cathode potential difference existing in the reproducing device 55 when sync pulse peaks sit at this level may be adjusted by varying the potential of the cathode 59.

An emitter-collector pulse output circuit is provided for the transistor 20 by connecting an output resistor 37, in series with a source of potential, such as battery 39, between the collector 35 and the emitter 31. As per the explanation of Fig. 1, there is appreciable current flow through this output circuit only during the periods of appearance of sync pulses at grid 57, since these are the only periods when current flow in the base-emitter path is in the "easy," low impedance direction. The output signal appearing across the output resistor 37 will thus be in the form of separated and amplified sync pulses. A capacitor 41 is provided to couple this signal output to a horizontal-from-vertical sync separator 61. The separator 61 may be of conventional form, operating in the usual manner on the sync pulse input from the transistor circuit to separate horizontal sync pulses from vertical sync pulses and provide two separate pulse outputs, which by means of the respective connections, H and V, are applied to the horizontal and vertical deflection generators 63 and 65 to synchronously control their operations.

While preferred embodiments of the present invention employing transistors of the junction type have been illustrated and explained in the foregoing discussions, other embodiments of the invention employing transistors of the so-called point-contact type in circuit arrangements similar to those shown in the accompanying drawings are believed by the applicants to also be advantageous. However, where the available point-contact transistors tend toward instability in a base input type of arrangement, the emitter input circuit arrangement, as exemplified in Fig. 1A, will be more desirable in point-contact transistor utilization.

While the present invention has been shown to have both signal correction and signal separation functions, it will be appreciated that the invention may not only be employed to advantage in the simultaneous performance of these dual functions, but may also be beneficially utilized for signal correction purposes only, or for signal separation purposes only.

What is claimed is:

1. In a television signalling system wherein a source of composite signals including recurring control pulses is coupled by a capacitor to an input terminal of a signal utilization device, the combination including a semiconductor device comprising a body of semiconductive material having three successive zones of alternately opposite conductivity type, a load impedance element and a source of potential connected in series relation between an outer zone of said semiconductor device and a point of reference potential, means for connecting one of the remaining two zones of said semiconductor device to said point of reference potential, means for applying said signals between the other of said remaining two zones and said point of fixed reference potential through said capacitor, the polarity of said applied signals being such that the excursion of said control pulses is in a direction to provide a forward bias between said one zone and said other zone thereby effecting a current flow through said device and through said load impedance element upon the maximum excursion of said pulses, the current flowing through said device upon the maximum excursion of said pulses establishing a charge on said capacitor of a magnitude determined by the average level of said signals, discharging current for said capacitor flowing between said one zone and said other zone during signal intervals intermediate said pulses, and a signal output circuit connected with said load impedance element for deriving therefrom an amplified replica of the maximum excursion of said pulses.

2. In a television signalling system, the combination comprising a source of composite signals including regularly recurring control pulses, a signal utilization device having an input electrode, signal coupling means including a capacitor connected in series between said source and said input electrode and a signal correction and signal separation circuit including a semiconductor device comprising a body of semiconductive material having three successive zones of alternately opposite conductivity type, means for applying an energizing current to said device including a signal output circuit connected with an outer zone of said device, a point of fixed reference potential, means connecting one of the two remaining zones of said three zones to said point of fixed reference potential, means including signal conveying means connected between the other of said remaining zones and the junction of said capacitor and said input electrode for both providing a low impedance current path to said point of fixed reference potential through said device for charging said capacitor upon the maximum excursion of said pulses and for providing a high impedance current path to said point of fixed reference potential through said device for discharging said capacitor during signal intervals intermediate said pulses, the current through said low impedance current path being effective to provide a forward bias between said one and said other zone for permitting a common current to flow through said device and said signal output circuit, and means for deriving from said signal output circuit an amplified replica of the maximum excursion of said pulses.

3. In a television signal receiving system wherein a source of composite video signals including recurring synchronizing pulses is coupled by a capacitor to an input terminal of a subsequent stage of said receiving system, a signal correction and signal separation circuit comprising a junction transistor having a base electrode, an emitter electrode, and a collector electrode, means for connecting one of said base and emitter electrodes to a point of fixed reference potential, means including said capacitor for applying said signals to the other of said base and emitter electrodes, the polarity of the synchronizing pulses of said applied signals being such as to provide a forward bias between said base and emitter electrodes and establish a low impedance charge current path for said capacitor through the base-emitter path of said transistor, whereby a charge is developed upon said capacitor of a magnitude determined by the average level of said signals, said base-emitter path in operation being forwardly biased only during the maximum excursion of said pulses and being reversely biased during intervening signal intervals to provide a high impedance discharge current path for said capacitor through said base-emitter path, and a pulse output circuit including a signal load impedance element connected with said collector electrode for applying an energizing potential thereto whereby an amplified replica of said synchronizing pulses is derived from said signal load impedance element.

4. In a television receiver wherein a source of composite video signals including recurring synchronizing pulses is coupled by a capacitor to an input electrode of a signal ultilization device, a signal correction circuit providing at least one charge adjusting path for said capacitor including a transistor having base, emitter and collector electrodes, a load resistor connected between said collector electrode and a point of fixed reference potential, said emitter electrode being directly connected to said point of fixed reference potential, and means including said capacitor for applying said composite signals to said base electrode, the polarity of the synchronizing pulses of said applied signals being such as to provide a forward bias between said base and emitter electrodes and establish a low impedance charge current path for said capacitor through the base-emitter path of said transistor, whereby a charge is developed upon said capacitor of a magnitude determined by the average level of said signals, said base-emitter path in operation being forwardly biased only during the maximum excursion of said pulses and being reversely biased during intervening signal intervals to provide a high impedance discharge current path for said capacitor through said base-emitter path.

5. In a television receiver, the combination comprising a source of composite video signals including recurring synchronizing pulses, a signal utilization device having an input electrode, signal coupling means comprising a capacitor connected between said source and said input electrode, a junction transistor having base, emitter and collector electrodes, means for connecting said emitter electrode to a point of reference potential, a load impedance and a source of potential connected between said collector electrode and said point of reference potential, and means for utilizing the current path in said transistor between said base and emitter electrodes as both a low impedance charging current path for charging said capacitor during the occurrence of said synchronizing pulses and the sole discharge current path for discharging said capacitor during signal intervals intermediate said pulses, said last-named means comprising means for connecting said base electrode to said input electrode of said signal utilization device, the polarity of the composite video signals provided by said source being such as to establish a forward bias between said base and emitter electrodes during the occurrence of said synchronizing pulses.

6. Apparatus in accordance with claim 5 also including synchronizing pulse utilization means, and means for coupling said synchronizing pulse utilization means to said load circuit.

References Cited in the file of this patent

UNITED STATES PATENTS

| | | |
|---|---|---|
| 2,299,944 | Wendt | Oct. 27, 1942 |
| 2,559,038 | Bass | July 3, 1951 |
| 2,570,938 | Goodrich | Oct. 9, 1951 |
| 2,627,039 | MacWilliams | Jan. 27, 1953 |
| 2,647,161 | Schlesinger | July 28, 1953 |
| 2,739,190 | Wallace | Mar. 20, 1956 |

OTHER REFERENCES

Forty (40) Uses for Germanium Diodes, Sylvania Electric Products, Inc., received March 11, 1952.